United States Patent
Goettle

[15] 3,672,126
[45] June 27, 1972

[54] AIR CONDITIONER

[72] Inventor: William H. Goettle, Scottsdale, Ariz.

[73] Assignee: Goettle Bros. Metal Products, Inc.

[22] Filed: July 20, 1970

[21] Appl. No.: 56,531

[52] U.S. Cl. ................................. 55/106, 55/122, 55/126, 55/135, 55/222, 55/227, 55/228, 55/233, 55/259, 55/268, 55/316, 55/318, 55/387, 55/467, 55/485, 261/116
[51] Int. Cl. .............................................. B03c 3/66
[58] Field of Search .................... 55/106, 122, 124, 126, 135, 55/222, 227, 228, 233, 259, 268, 316, 318, 387, 467, 485; 261/116

[56] References Cited
UNITED STATES PATENTS

| | | | |
|---|---|---|---|
| 2,490,979 | 12/1949 | Palmer | 55/128 X |
| 2,628,083 | 2/1953 | Rense | 55/267 X |
| 3,370,403 | 2/1968 | D'Elia et al. | 55/126 X |

*Primary Examiner*—Dennis E. Talbert, Jr.
*Attorney*—Drummond, Cahill & Phillips

[57] ABSTRACT

An air cleaner having a plurality of spaced apart filters including an electronic filter, as well as other filters and a spray chamber disposed between some of said filters and having spray nozzles adapted to emit cool liquid in a flow path of air through said filters; and refrigeration means for cooling said liquid so as to cool said air to a degree at which a dew point condition exists such that liquid sprayed into the air will collect moisture from the air, thereby drying and also cooling it.

8 Claims, 3 Drawing Figures

INVENTOR.
WILLIAM H. GOETTL

AIR CONDITIONER

Various air conditioners have been used for cleaning air and/or various gases. Various well-known filtering elements have been used for cleaning air, however, the prior art has not been specifically devoted to complete air cleaning and air conditioning equipment all composed in a single compact unit for home use. Due to polluted air conditions in many areas, it has become important to clean air for induction into residences and other areas in which human beings are disposed.

It has been found necessary to utilize not only filtering means for removing finite material, gases and other foreign matter from the air, but also to condition the air at the same time such that it is cooled and dried by means of a liquid washing process which also contributes to air cleaning and filtering.

The prior art has not embraced a compact air conditioner which accomplishes all of the foregoing purposes in a desirable manner and within an economic range suitable for use in the home or other numerous areas in which human beings are enclosed in buildings or the like.

In accordance with the present invention, a simple air conditioner housing contains a plurality of air filters disposed successively in an air flow path through the housing and a blower is disposed in the housing to force air to pass through the filters in said flow path. A liquid spray chamber is disposed between some of the filters, and a sump is disposed below the liquid spray chamber. Communicating with the sump is a pump adapted to supply liquid to spray nozzle means in the spray chamber so as to completely spray air passing through the flow path of the housing. Refrigeration means is disposed in the sump below the spray chamber for cooling water or other liquid sprayed through the spray chamber nozzles in the spray chamber. The refrigeration means is capable of cooling the liquid in the sump sufficiently so that the spraying of the liquid into the air passing in the flow path of the housing, causes a dew point condition to exist and to thereby dry the air by collecting moisture therefrom, while at the same time cooling the air.

The invention includes an electronic or electrostatic air filter as well as an activated charcoal filter in combination with the spray chamber and the foregoing means for refrigerating spray to be issued from nozzles in the chamber. The invention also includes a heating coil which is disposed between the spray chamber of the invention and the air conditioner outlet for reheating air after passing through the spray chamber.

The various filters of the invention remove relatively coarse foreign matter from the air as well as finite material down to .03 microns, or less, so that all of the elements of smog and air pollution may be removed from air and it may be delivered to a building room in suitable condition for breathing by humans. The invention is arranged efficiently to condition air for that general human use and especially so in cases involving persons having respiratory problems. Emphysema patients are particularly vulnerable to smog and may benefit greatly by use of the air conditioner of the invention. The various elements of the invention including the filters, the spray chamber, the refrigeration coil, the blower and liquid pump which are all arranged in a very novel and compact manner in a housing suitable for installation relative to various buildings as may be desired.

Accordingly, it is an object of the present invention to provide a very efficient air cleaner and air conditioner for use in cleaning air for human breathing purposes.

Another object of the invention is to provide a very compact air conditioner including electronic air filtering means as well as activated charcoal and liquid washing facilities which cool and dry the air; and in addition, the invention includes other filters and heating means for conditioning the air as desired together with means for moving the air through a flow path in a compact air conditioner housing.

Another object of the invention is to provide a novel combination of air filtering means with a spray chamber adapted to receive water and other liquid from a refrigerated area so as to create a spray pattern of liquid which is dense and wherein the liquid is sufficiently cooled to cause a dew point condition relative to the air passing through the chamber so that the air may be cooled and moisture may be collected therefrom while at the same time the air is efficiently washed.

Other objects and advantages of the invention may be apparent from the following specification, appended claims and accompanying drawings.

Figure 1:
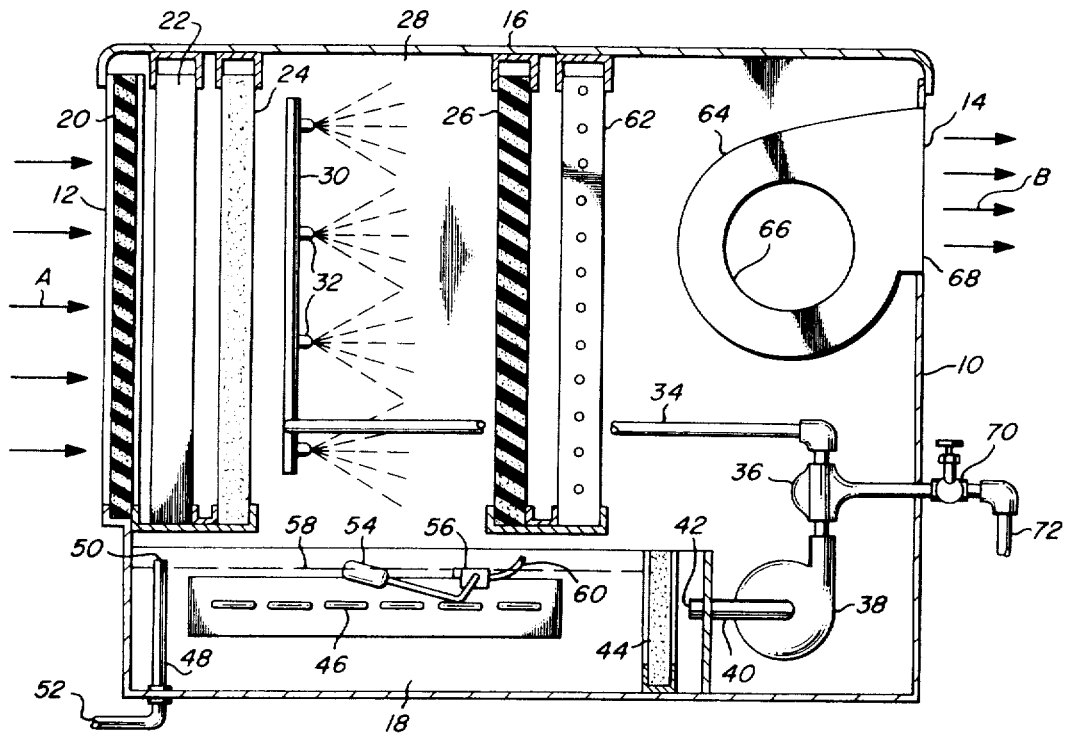
FIG. 1 is a vertical sectional view of an air conditioner in accordance with the present invention showing by arrows a flow path for air through the air conditioner and showing by solid lines various parts and portions in elevation to amplify the illustration.

As shown in FIG. 1 of the drawings, the air conditioner of the invention is provided with a housing 10 having an air flow inlet 12 and an air flow outlet 14. The housing 10 is provided with a cover 16 at the upper portion thereof and disposed in a lower portion of the housing 10 is a liquid sump 18. The housing 10 defines a flow path adapted to pass air as indicated by arrows "A" and "B" at the inlet 12 and outlet 14 respectively of the housing 10. Disposed in the flow path through the housing 10 and adjacent the housing inlet 12 is a prefilter 20 adapted to receive and pass air therethrough. This prefilter 20 is particularly utilized in accordance with the present invention to remove large particles of foreign matter from the air preliminary to the passage of the air into an electronic air filter 22 which is generally of the electrostatic type. The filter 22 is disposed inward from the filter 20 relative to the inlet 12 and is therefore disposed between the filter 20 and the outlet 14. The filter 20 is a substantial porous filter and may be of conventional polyurethane foam such as to remove coarse particles from the air before the air passes through the electronic air filter 22 which is adapted to collect finite particles from the air as for example, particles down to or less than 0.03 microns in size. This air filter 22 will remove smoke, various virus, fumes, fog, mist, fungus, bacteria, pollen, and other foreign matter from the air which may be damaging or irritating to the human respiratory system.

Disposed adjacent to the electronic air filter 22 is an activated charcoal filter 24. This filter 24 is adapted to remove ozones and odors from the air as it moves through the flow path of the housing 10. The activated charcoal filter 24 is thus disposed between the electronic air filter 22 and the outlet 14 of the housing 10.

A spray chamber outlet filter 26 is substantially spaced from the activated charcoal filter 24 and between these filters 24 and 26 a spray chamber 28 is defined in the flow path of the housing 10. A liquid containing and delivery manifold 30 is provided with a plurality of spray nozzles 32 adapted to spray water or other liquid into the spray chamber 28 and impinge upon the wash air as it passes through the flow path of the invention from the activated charcoal filter 24 to the spray chamber outlet filter 26. The spray chamber outlet filter 26 is similar to the prefilter 20 in that it is a porous filter and may be made of polyurethane foam, or the like, or, the filters 20 and 26 may be of any suitable porous air filtering material as desired for this purpose.

Communicating with the manifold 30 is a conduit 34 which receives water through a fluid induction device 36 to which water is delivered by a pump 38 having an inlet conduit 40 communicating with the interior of the sump 18. Disposed in the sump 18 adjacent an inlet end 42 of the conduit 40 is a liquid filter 44. This filter 44 is disposed to prevent foreign matter from entering the inlet 42 of the conduit 40 and the pump 38. The liquid filter 44 may also be any one of various liquid filters adapted to remove certain material or elements from water or other liquid in the sump 18 preliminary to the passage of the liquid through the pump 38 and into the spray nozzles 32 and spray chamber 28.

Disposed in the sump 18 is a refrigeration coil 46 adapted to operate as an evaporator for Freon or the like. This coil 46 may also be coupled to a heat pump so as to either cool the liquid in the sump 18 to a substantial degree below ambient air temperature, or the coil 46 may also be used to heat the water in the sump 18 if the air conditioner of the invention is to be used as a humidifier.

When the water is cooled in the sump 18 by the coil 46, the water may be at such temperature as it issues from the nozzles 32 so that air is caused to reach a dew point condition with respect to the spray and thus the air is cooled and relieved of moisture. Thus the air is cooled and dried before passing into and through the spray chamber outlet filter 26.

When the coil 46 is used to heat the water in the sump 18, the water delivered from the nozzles 32 may be at such temperature as to cause evaporation into the air passing in the spray chamber 28 and in this mode of operation, humidification of the air may be accomplished.

The sump 18 is provided with an overflow tube 48 having an upper open end 50 disposed at the maximum predetermined water or liquid level in the sump 18. Thus, when liquid spray is delivered from the nozzles 32 at a dew point condition and when liquid or water is thus collected from the air passing through the spray chamber 28, an increase of liquid in the sump 18 may be dispensed with by means of the overflow tube 48 which is coupled to the conduit 52 which may be disposed to carry the overflow water to a suitable drain.

A float 54 in the sump 18 operates a float valve 56 disposed to maintain liquid in the sump at a predetermined level as indicated by a broken line 58.

When the air conditioner is operated as a humidifier as hereinbefore described, water from the sump 18 may be admitted into the air passing through the spray chamber 28 and thus the float valve 56 is opened when the float 54 drops and consequently this valve 56 tends to maintain the water or liquid level at 58 as shown in FIG. 1 of the drawings. Coupled to the float valve 56 is a conduit 60 which may be coupled to any suitable source of water under pressure so that a constant supply to the float valve 56 is provided. Thus, makeup water may automatically be added to the sump 18 in case the supply of water in the sump 18 is used during a humidification operation of the air conditioner of the invention.

Disposed between the spray chamber outlet filter 26 and the housing outlet 14 is a heating coil 62. This heating coil 62 may be a conventional tubular finned coil adapted to receive hot fluids or the coil 62 may be an electrical resistance heater if desired. The heating coil 62 is utilized to bring air temperature up to a suitable degree in relatively cold ambient temperature conditions. This heating coil 62 is not used when it is desired to cool the air as may be accomplished by refrigerated liquid spray entering the spray chamber 28 and cooling the air as it passes through the flow path of air in the housing and in the spray chamber 28.

A centrifugal blower 64 is disposed adjacent the outlet 14 of the housing 10. This blower 64 is provided with inlet eyes 66 and is provided with an outlet 68 communicating directly with the housing outlet 14 for delivering air therefrom in the direction of the arrows B as shown best in FIG. 1 of the drawings.

In operation, the invention as shown in FIG. 1, may be maintained by periodic replacement or cleaning of the prefilter 20 and cleaning of the electronic air filter 22. The cover of the housing 10 may be removed for such operations as cleaning or replacing any one of the filters 20, 22, 24, 26 or for servicing the various equipment in the housing including the heating coil 62, pump 38, float valve 56 and/or refrigeration coil 46.

The electronic air filter 22 as shown in FIG. 1 is disposed between the inlet 12 of the housing and the spray chamber 28 so that substantially all of the particulate matter or foreign matter in the air is removed before the air enters the spray chamber 28 and thus maintaining a very clean condition of the water in the sump 18. This water after being sprayed from the nozzles 32, gravitates to the sump 18 and is again pumped through the pump 38 and back to the nozzles 32. The fluid induction device 36 is provided with an inlet valve 70 communicating with a tube 72 which may conduct oxygen under pressure or any other fluid which it is desired to add to the stream of water passing into the conduit 34 from the induction device 36. In this manner, oxygen may be added to the air by releasing it from the spray nozzles 32 and into the flow path of air in the spray chamber 28. Other liquids or fluids may be induced into the water passing through the conduit 34 and subsequently into the air in the spray chamber 28 as will be hereinafter described.

The fluid induction device 36 may be an aspirator device or it may be a differential pressure device relying upon higher fluid pressure in the conduit 72 than that in the outlet of the pump 38.

It will be understood that various fluids for conditioning the water in the sump 18 may be induced through the fluid induction device 36 to prevent bacteria or other materials from growing in the water in the sump 18.

The spray chamber outlet filter 26 is adapted to stop water mist from passing out of the spray chamber 28. Thus, the filter 26 causes liquid to drain back into the sump 18 after being sprayed into the spray chamber 28.

In operation, the air conditioner of the invention functions in a novel manner with respect to the washing of air by liquid spray from the nozzles 32 while at the same time collecting all coarse fine particles as well as various odors, ozones, and gases from the air all in the same housing and utilizing the same air-moving blower. Furthermore, the air conditioner of the invention, by utilizing the spray chamber 28, may function as an air cooling and drying device or may function as a humidifier and heating device. The foregoing functions may be implemented by the combination of the filters, refrigeration coil 46, spray nozzles 32, the spray chamber 28 and the heater 62 which is disposed between the spray chamber and the housing outlet 14.

Figure 2:
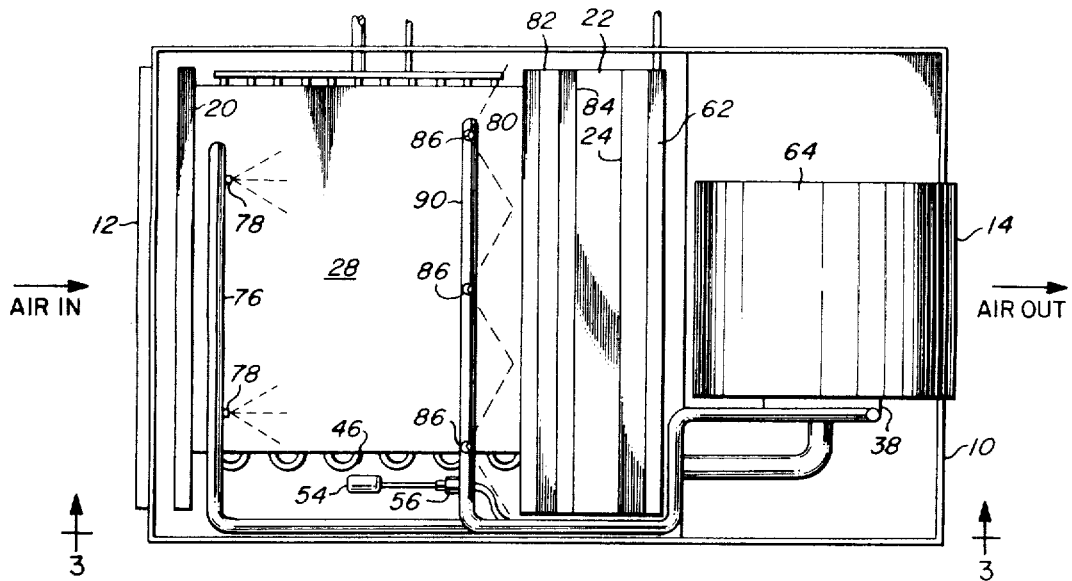
FIG. 2 is a top or plan view of a modified form of the invention showing a housing with the cover thereof removed to expose details of the invention therein.
Figure 3:
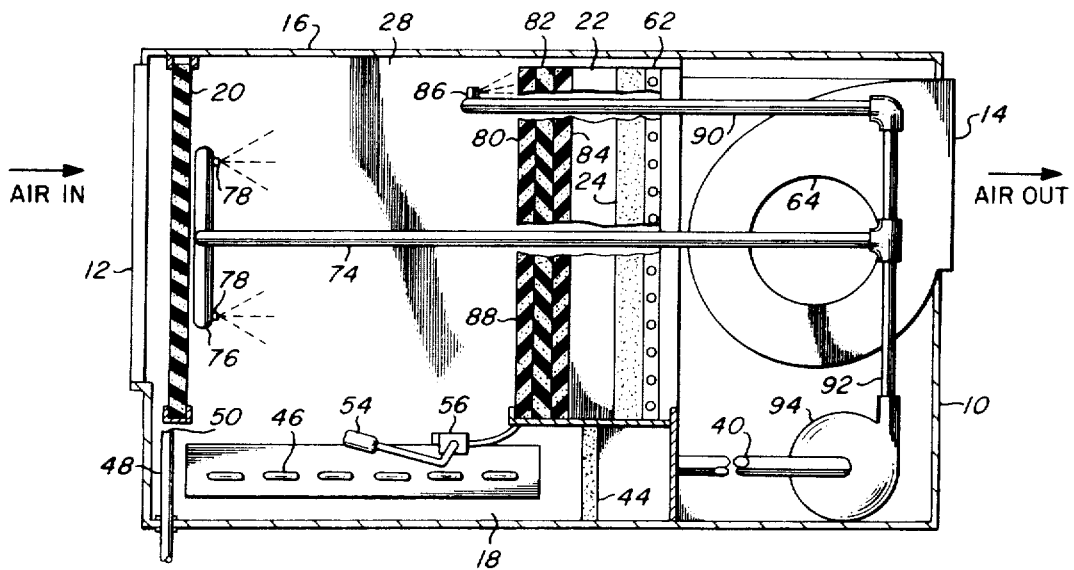
FIG. 3 is a sectional view taken from the line 3—3 of FIG. 2.

In the modification of the invention as shown in FIGS. 2 and 3 of the drawings, the housing 10 is provided with an inlet 12 and an outlet 14 similar to that shown in FIG. 1 of the drawings, and all of the other equipment is similar except that the arrangements of the filters and the spray chamber 28 are somewhat different. Communicating with the inlet 12 of the housing 14 is a prefilter 20 similar to the prefilter 20 shown in FIG. 1 of the drawings. The spray chamber 28 is located immediately adjacent the prefilter 20 and a conduit 74 similar to the conduit 34 delivers liquid under pressure to a manifold 76 having spray nozzles 78 adapted to emit spray into the spray chamber 28 in the general direction of the air flow therein.

Disposed at the outlet end of the modified spray chamber 28 are three spray chamber outlet filters 80, 82 and 84 disposed respectively and sequentially in the direction of air flow through the flow path of the invention from the inlet 12 to the outlet 14 of the chamber 10.

These spray chamber outlet filters 80, 82 and 84 are adapted to collect intermediate sized foreign matter which is not collected by the prefilter 20 and the spray chamber 28 is utilized to spray and wash air and also to cause the particles to be impinged upon by liquid spray and to collect on the spray chamber outlet filter 80.

A flood nozzle 86 is adapted to flood a surface 88 of the filter 80 adjacent the spray chamber 28 and the flood nozzles 86 communicate with a conduit 90 which also communicates with the conduit 74 and an outlet 92 of a pump 94 which is similar to the pump 38 shown in FIG. 1 of the drawings.

An electronic air filter 22 is similar to that shown in FIG. 1 of the drawings, and is disposed between the spray chamber outlet filter 84 and the outlet 14 of the housing 10 all as shown best in FIG. 3 of the drawings.

The electronic air filter 22, as shown in FIG. 3, is disposed downstream of the spray chamber and does not require cleaning as often as does the electronic air filter shown in FIG. 1. The spray chamber outlet filters 80, 82 and 84 receive most of the particulate matter which is washed down by the nozzles 86 and thus the water in the sump 18 collects most of the particulate matter which is removed from the air by means of washing in the spray chamber 28. The spray chamber 28 also functions in a manner as hereinbefore described in that the refrigeration coil 46 may be used to cool or heat the water in the sump 18 and thus create either a dew point condition in the chamber 28 or an evaporating condition either to remove moisture from the air or add moisture to the air. It will be understood that when the moisture is being removed as hereinbefore described, a dew point condition exists and the air is also cooled.

As shown in FIG. 3 of the drawings, an activated charcoal filter 24 similar to that shown in FIG. 1 of the drawings, is disposed between the electronic air filter 22 and the outlet 14 of the housing, and a heating coil 62, similar to the heating coil 62 shown in FIG. 1 of the drawings, is disposed between the activated charcoal filter 24 and the outlet 14 of the housing.

It will be understood that, in accordance with certain environmental conditions and installations, the invention may be arranged as shown in FIG. 1 of the drawings, or as shown in FIGS. 2 and 3 of the drawings, depending upon whether or not it is desired to wash the air in the spray chamber 28 after it has passed through the electronic air filter 22 or preliminary thereto, respectively, and also depending upon the relative maintenance factors in relation to the water in the sump 18 and the cleaning of the electronic or electrostatic air filter 22. Under some environmental conditions it will be obvious that the invention as shown in FIG. 1 may be preferable while in other environmental conditions the embodiment shown in the modification disclosed in FIGS. 2 and 3 may be preferable.

A blower 64 as shown in FIGS. 2 and 3, is similar to that shown in FIG. 1 of the drawings.

The heating coil 62 shown in FIG. 1 and in FIGS. 2 and 3 is generally disposed downstream from the spray chamber outlet filters so as to avoid heating the air at the inlet area of the spray chamber 28. In this manner, undue humidification is avoided and operation of the spray chamber 28 as hereinbefore described is permitted to provide for cooling and drying the air as well as cooling and humidification of the air. It will therefore be obvious that the disposition of the heating coil 62, in the air flow path downstream from the spray chamber 28, is important and that this heating coil 62 must be located between the spray chamber 28 and the outlet of the housing 10 in order to function in cooperation with the refrigeration coil 46 and the water cooled thereby, which water is emitted through the spray nozzles in each of the spray chambers 28 as hereinbefore described.

I claim:

1. In an air cleaner the combination of: a housing having first means defining an air flow path therethrough; second means for forcing air to flow through said housing along said flow path; said housing having an inlet and an outlet communicating with said flow path; a liquid spray chamber in said first means; nozzle means in said chamber for impingement spraying of air passing through said flow path; a sump below said chamber for containing water; refrigeration means in said sump for cooling said water in said sump; pump means for pumping cool water from said sump to said nozzle means; said spray chamber having an inlet and an outlet; a first air filter disposed and adapted to pass air at said outlet of said spray chamber; an electronic air filter in said flow path of said first means; said electronic air filter adapted to remove fine particles in the micronic range, from air passing through said flow path; said refrigeration means adapted to cool said water to a degree whereby spray of said cool water washes said air and causes a dew point condition relative to moisture in said air to thereby clean, dry and cool said air before it passes to said outlet of said housing.

2. The invention as defined in claim 1 wherein a precleaning filter is disposed at said inlet of said chamber; said nozzle means disposed to receive water from said pump and to emit spray in said chamber adjacent said inlet side of said first filter; and a filter between said sump and said pump for preventing material collected in said water from entering said pump.

3. The invention as defined in claim 1 wherein an activated charcoal filter in said air flow path is disposed and located between said first filter and said outlet of said housing.

4. The invention as defined in claim 1 wherein a heater is disposed for heating said air, said heater being located between said first filter and said outlet of said housing.

5. The invention as defined in claim 1 wherein an activated charcoal filter is disposed in said flow path and a heater is disposed in said flow path for heating air, said heater being located between said first filter and said outlet of said housing.

6. The invention as defined in claim 1 wherein a water makeup delivery valve is disposed to deliver water to said sump and a float operably connected to said valve to open and admit water to said sump when the water level therein reaches a predetermined minimum level; and an overflow means disposed to allow drainage of water from said sump when the level of water reaches a predetermined maximum.

7. In an air cleaner the combination of: a housing having first means defining an air flow path therethrough; second means for forcing air to flow through said housing along said flow path; said housing having an inlet and an outlet communicating with said flow path; a liquid spray chamber in said first means; nozzle means in said chamber for impingement spraying of air passing through said flow path; a sump below said chamber for containing water; refrigeration means in said sump for cooling said water therein; pump means for pumping cool water from said sump to said nozzle means; said spray chamber having an inlet and an outlet; first and second air filters disposed and adapted to pass air at said inlet and outlet respectively of said spray chamber; an electronic air filter in said flow path of said first means, said electronic air filter located between said first air filter and said outlet of said housing; said refrigeration means adapted to cool said water to a degree whereby spray of said cool water washes foreign matter from said air and causes a dew point condition relative to moisture in said air to thereby clean, dry and cool said air before it passes through said electronic air filter and to said outlet of said housing.

8. The invention as defined in claim 1 wherein a precleaning filter is disposed at said inlet of said housing; said electronic air filter being disposed between said precleaning filter and said spray chamber; a heating means disposed in said flow path between said first filter and said outlet of said housing for heating air after it has passed through spray chamber; and an activated charcoal filter in said flow path of said housing.

* * * * *